Feb. 7, 1950 D. O. WOODBURY 2,496,647
PORTABLE IMAGE PROJECTOR
Filed April 7, 1948 3 Sheets-Sheet 1

Inventor:
David O. Woodbury,
by Kenway, Jenney, Witter & Hildreth
Attorneys

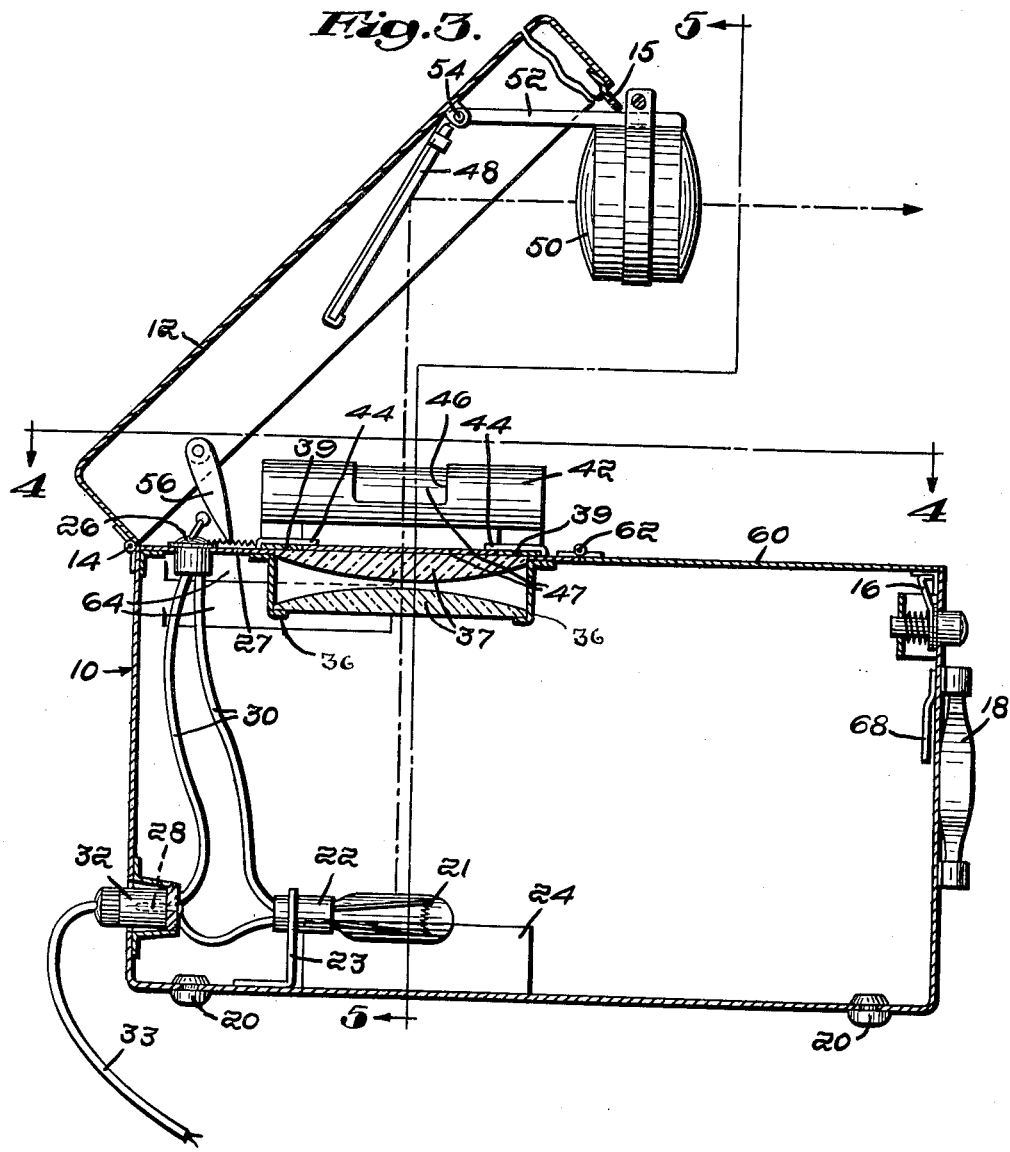

Feb. 7, 1950     D. O. WOODBURY     2,496,647
PORTABLE IMAGE PROJECTOR
Filed April 7, 1948     3 Sheets-Sheet 3
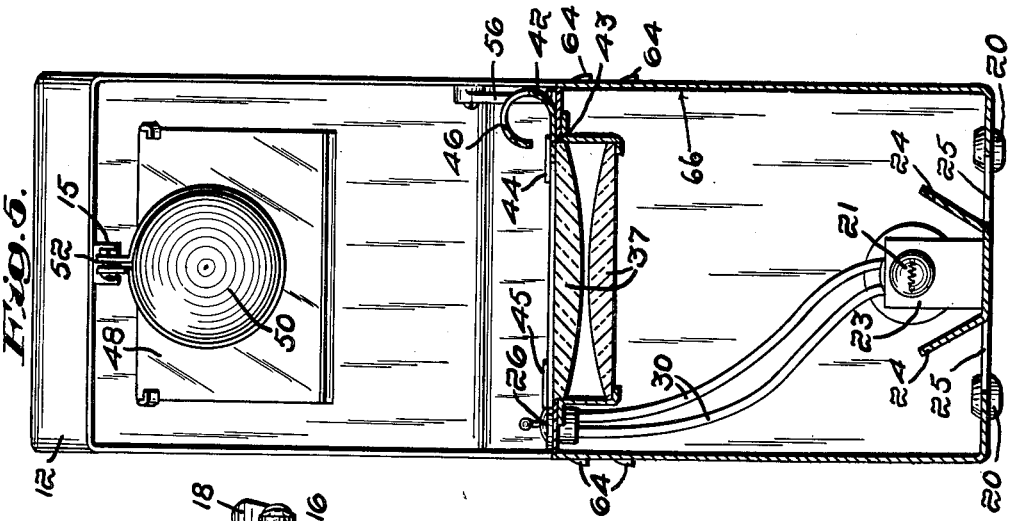
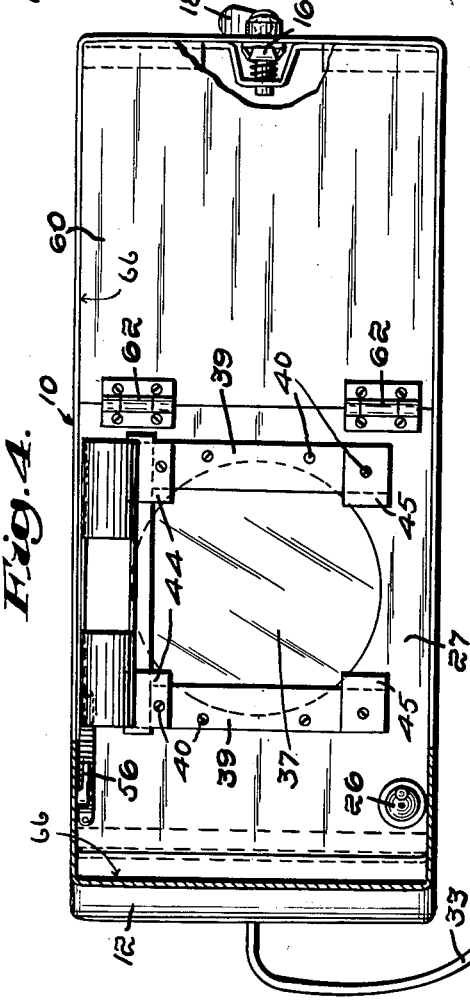
Inventor:
David O. Woodbury,
by Kinney, Jenny, Witter & Hildreth
Attorneys Patented Feb. 7, 1950

2,496,647

UNITED STATES PATENT OFFICE 2,496,647

PORTABLE IMAGE PROJECTOR

David O. Woodbury, Bronxville, N. Y.

Application April 7, 1948, Serial No. 19,492

7 Claims. (Cl. 88—24)

This invention relates to apparatus for projecting an image onto a screen and more particularly to a novel and exceedingly compact device of this nature conveniently housed within a carrying case or box which also serves as a support for the apparatus in use. The case is provided with a closure cover and handle and can be conveniently carried about. A portion of the projector system is attached to the under side of the cover in position immediately to cooperate with the apparatus in the box for projecting purposes when the cover is raised. Thus the apparatus can be conveniently carried about and can be quickly and conveniently set up and used with great simplicity and little preparation.

The device is particularly useful to lecturers, teachers, salesmen, etc., and can be employed for projecting not only slides and like prepared subject matter but also subject matter drawn or sketched on the object glass by the lecturer while he is addressing his audience. The device is so constructed that the operator faces the audience with the screen at his back so that the audience sees the projected subject matter on the screen simultaneously with its creation on the object glass by the lecturer. The production of an improved apparatus of this nature having the novel and desirable features above and hereinafter described comprises the primary object of my invention.

These and other features of the invention will be best understood and appreciated from the following description of a preferred embodiment thereof selected for purposes of illustration and shown in the accompanying drawings in which—

Fig. 3 is a like view with the apparatus opened for use,

Fig. 4 is a plan view taken on line 4—4 of Fig. 3, and

Fig. 5 is a sectional view taken on line 5—5 of Fig. 3.

Figure 1:
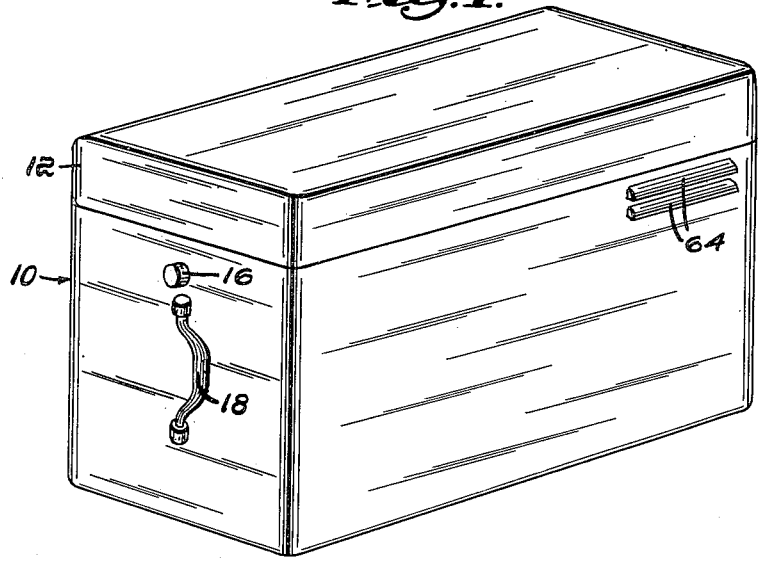
Fig. 1 is a perspective view of my projector enclosed in its case for carrying.

The primary object of my invention resides in the production of a relatively simple and inexpensive projector particularly adapted for use by lecturers and teachers for projecting onto a screen various illustrations and data of the subject matter being discussed. The invention more particularly concerns a projector built into and housed within a carrying case or box 10 having a cover 12 pivoted at 14 to one end margin of the box. The cover and box are provided with a detent 15 and latch 16 for holding the cover closed and a carrying handle 18 is provided on one end of the box. The box is adapted to be supported on four rubber buttons 20 secured to its bottom wall and holding the box in spaced relation from the table or other supporting surface.

A light source is provided by an electric bulb 21 in a socket 22 carried by a bracket 23 mounted on the bottom wall. Two upwardly extending wings 24 struck out from the bottom wall at opposite sides of the bulb provide protection to and light reflecting surfaces for the bulb and vent openings 25 through the bottom wall. The light is controlled by a switch 26 carried on a horizontal plate 27 at the top of the box and connected to the socket and terminals 28 by wires 30. The terminals 28 are adapted to receive the plug 32 of a cord 33 having a terminal plug 34 at its other end.

Disposed above the bulb on brackets 36 beneath and carried by the plate 27 are two condenser lenses 37, the flat top surface of the upper lens serving as a transparent object supporting table 38. A suitable opening for reception of the lens is provided in the plate 27 and two parallel slides or film-engaging guides 39 are provided on the plate on opposite sides of the lens and opening, the guides being secured to the plate by screws 40. The guides are adapted to receive and guide either glass slides or strip film and a further feature of the invention contemplates a scroll or magazine 42 for housing and dispensing the film. The scroll is supported by a straight end portion 43 adapted to be received beneath a pair of lugs 44 attached to the rear ends of the guides, and the curved portion is preferably cut away at 46 to permit the operator to roll the film in and out manually. In use the film 47 is pulled out manually from the magazine 42, passed beneath lugs 44, then across the table and beneath lugs 45, whereupon it is in position for operation. As fresh film is needed it is fed out of the magazine manually, the used portion being allowed to fall over the edge of the table. Used portions of the film can be returned to the table for projection by reeling the film back into the magazine manually, with the aid of cutaway portion 46.

A further novel feature of the invention resides in mounting on the inside of the cover 12 a mirror 48, preferably reflecting from a coating on its front surface, and a cooperating lens 50 for receiving light rays from the lens 37 and projecting them onto a screen. Preferably the mirror and lens 50 are supported in relatively fixed relation and for this purpose I mount them on an angular frame 52 and pivot the frame to the cover at 54, with a single bearing, or, at its corners, if more stability is required. In either case the pivot or pivots permits pivotal movement of the frame, to adjust and hold any desired angle of the frame, such adjustment being retained either by sufficient tightness of the pivot screws, or, preferably, by the use of an adjusting thumbscrew, affixed to the inside of the cover 12 and operating by contact to move the frame in and out. The cover 12 is pivotally movable to the open position illustrated in Fig. 3 and a pawl 56 pivotally attached to the cover and engaging a toothed rack 58 on the plate 27 is adapted to hold the cover in the desired angular position. When the cover is in the open position of Fig. 3 the frame and cover can be adjusted simultaneously, so as to receive the light rays in the mirror and reflect them through the lens to an accurate focus upon the screen. A second advantage of this double adjustment is that the projected image can therewith be adjusted up and down to accommodate this image to screens at various heights. It is understood that in all positions of the mirror except when it is at 45° to the table, the axis of the projected beam will not pass exactly through the center of lens 50. However, with a suitable choice of lens shape and diameter, such lack of coincidence between axis and center will not noticeably affect the sharpness of the projected image. Also, while I have illustrated the lens 50 as receiving and projecting light rays from the mirror 48 it will be readily apparent that the positions of these two elements can be reversed.

In use the operator sits or stands with his back to the screen and his right hand adjacent to the table 38. A lid 60 pivoted to the plate 27 at 62 is adapted in the position of Fig. 3 to cover the right hand top opening portion of the box and provide a rest for the operator's arm and wrist while sketching on or manipulating the object on the table. When the apparatus is packed for carrying, the scroll 42 is removed and the lid is pivoted to the position of Fig. 2 thereby covering and protecting the lens 37 and leaving the box open to receive the lens 50.

Cooling ventilation for the box is provided by the openings 25 in the bottom wall and louvre openings 64 in the side walls. It is also desirable that the apparatus shall be kept as cool as possible for the comfort of the operator and to this end I preferably construct the box of polished aluminum painted or varnished on the outside to a pleasing finish and selectively painted on the inside to dissipate heat away from the operator. This object is accomplished by painting the inside walls at 66 remote from the operator a dense black while leaving the remaining inside walls and lid adjacent to the operator a reflecting bright surface. The walls thus painted will absorb a substantial amount of heat which will be dissipated away from the operator while the non-painted walls adjacent to the operator will reflect the heat, thereby keeping the operator's side of the apparatus relatively cool. Further, ventilation can also be provided by a motor-operated fan in the box, if desired.

Figure 2:
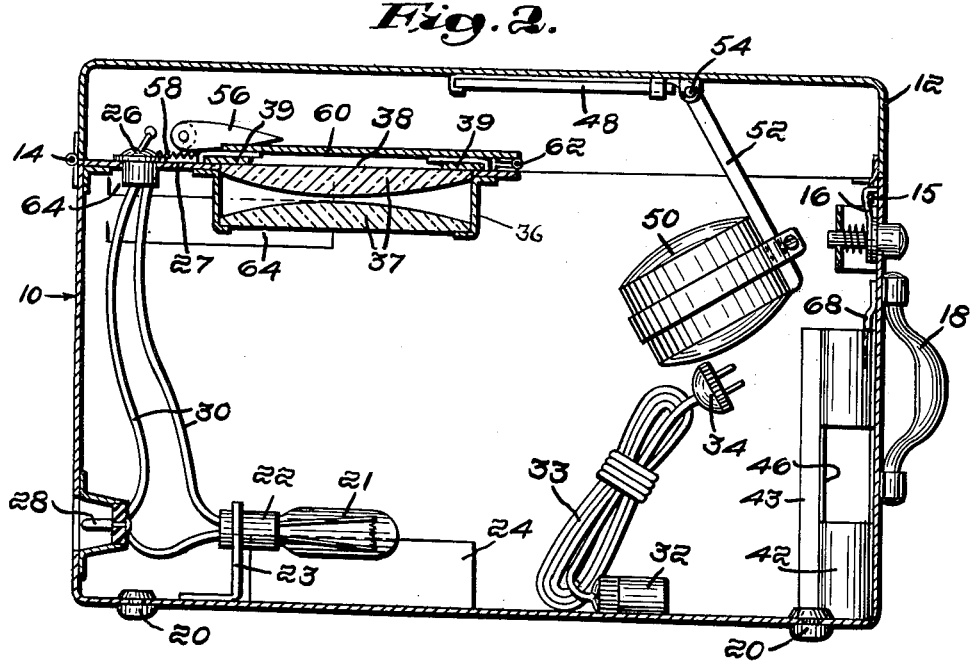
Fig. 2 is a longitudinal sectional view therethrough.

It is believed that the use and advantages of my improved projecting unit will be apparent. When not in use the entire unit is compactly housed within the carrying case 10 as shown in Fig. 2. The scroll 42 is supported by a clip 68 and the box provides plenty of room for the cable 33 and other required items. The frame 52 is pivoted to the position shown in Fig. 2 in which the lens 50 will pass into the box when the cover is closed. The unit can be set up for use on short notice merely by raising the cover and adjusting the various parts to the positions shown approximately in Fig. 3.

The apparatus is adapted to project from stereopticon slides or film on which the subject matter has been permanently placed for projecting purposes or from slides or film which have been treated to receive a stylus or pencil for marking the subject matter to be projected. In the former case standard 3¼ inch x 4 inch slides will fit directly between the guides 39, while smaller transparencies, slide film, etc., can be projected by the use of a simple masking plate to cut down the field of light to the proper dimensions. In the case of treated film or plates, the operator creates the image object at will with a stylus while talking to his audience and the audience sees the object on the screen simultaneously with its creation on the slide or film. The slide or film can be coated with a material adapted to be scraped off by such stylus to leave transparent markings through which the light will project, or it can be a wholly transparent surface adapted to receive and be marked on by a suitable pencil or crayon. In all cases the operator and audience see the same object and the operator has the advantage of reaching his audience continuously by sight as well as by sound, and the further advantage of maintaining direct control of the material which he desires to project. I have furthermore found that the compact arrangement of my improved projecting and cooling system permits the use of much smaller lamp powers as a light source, such as a 150-watt projection lamp, or 150-watt standard bulb, in lieu of the 500-watt bulb ordinarily required in apparatus of this nature.

Having thus disclosed my invention, what I claim as new and desire to secure by Letters Patent is:

1. Apparatus for projecting an image onto a screen, comprising a box, a transparent object supporting table at the top of the box, an electric lamp in the box beneath the table, a light transmitting medium between the lamp and table, a cover for enclosing the top of the box, means for supporting the cover on the box in inclined open position above the table, an image projecting lens and a mirror carried by the cover at its inner face above the table in position to receive light rays therefrom and project them to a screen, and means for securing the cover in closed position on the box.

2. The apparatus defined in claim 1 plus a frame supporting the mirror and lens in fixed relative alignment, and means pivotally supporting the frame on the cover.

3. The apparatus defined in claim 1 in which the first named means supports the cover inclined upwardly from one margin at the top of the box, and a lid pivoted to the box between the table and the opposite margin, the lid being adapted in one pivoted position to cover the top opening of the box adjacent to said opposite margin and in another pivoted position to cover the table and leave said top opening open for receiving the lens when the cover is closed onto the box.

4. The apparatus defined in claim 1 in which the first named means includes a pivotal connection between the cover and one top margin of the box, and means for supporting the cover in pivotal positions of different angularity above the box.

5. The apparatus defined in claim 1 in which an inside side wall of the box is provided with a reflecting surface and the opposite inside side wall is provided with a black heat absorbing surface.

6. The apparatus defined in claim 1 in which the box and cover are of rectangular shape and in which the lens and mirror are supported on the cover by pivoted means providing angular adjustment of the lens and mirror relative to the cover and in a plane between and parallel with the two side walls of the box.

7. The apparatus defined in claim 1 in which the lens and mirror are supported on the cover by pivoted means providing angular adjustment of the lens and mirror about at least one axis extending transversely of the box.

DAVID O. WOODBURY.

REFERENCES CITED

The following references are of record in the file of this patent:

UNITED STATES PATENTS

| Number | Name | Date |
|---|---|---|
| 1,218,749 | Deming | Mar. 13, 1917 |
| 1,351,765 | Koch | Sept. 7, 1920 |
| 1,447,403 | Atherton | Mar. 6, 1923 |
| 1,545,674 | MacKay | July 14, 1925 |
| 1,738,942 | Brenkert et al. | Dec. 10, 1929 |
| 2,070,226 | Erwood | Feb. 9, 1937 |
| 2,181,134 | Katz | Nov. 28, 1939 |
| 2,268,450 | Haggett | Dec. 30, 1941 |
| 2,381,260 | Coker | Aug. 7, 1945 |